United States Patent Office 2,983,737

Patented May 9, 1961

1

2,983,737

16α-METHYL-6α-FLUORO-PREGNANE DERIVATIVES

Carl Djerassi and Howard J. Ringold, Mexico City, Mexico, assignors to Syntex, S.A., Mexico City, Mexico, a corporation of Mexico No Drawing. Filed Nov. 5, 1959, Ser. No. 850,996

Claims priority, application Mexico Nov. 13, 1958

1 Claim. (Cl. 260—397.45)

This invention relates to certain new cyclopentanophenanthrene derivatives.

More particularly, it relates to the novel 16α-methyl-6α-fluoro-pregnane derivatives, and more specifically to 16α-methyl-6α-fluoro derivatives of 11-epi-hydrocortisone and 11-epi-prednisolone, and to their esters. It further relates to new intermediaries obtained in the production of the aforegoing new compounds.

The compounds which are the object of the present invention are potent cortical hormones which exhibit anti-androgenic and anti-estrogenic activity. They are also useful intermediates for the preparation of the 16α-methyl - 6α,9α - difluoro and 16α - methyl - 6α-fluoro-9α-chloro derivatives of cortisone, hydrocortisone, prednisone and prednisolone, which derivatives have already been described in patent application Serial No. 789,242, filed on January 27, 1959.

The new compounds, object of the present invention, are represented by the following formulas:

(*a*) Compounds of the following general formula:

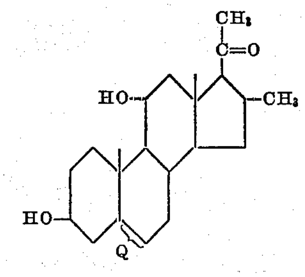

wherein Q is a member of the group consisting of $C^5{=}C^6$,

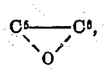 and 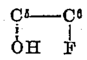

(*b*) Compounds of the following general formula:

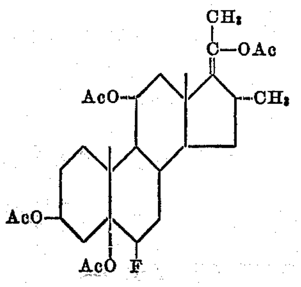

in which Ac is the acyl radical of a hydrocarbon carboxylic acid of up to 4 carbon atoms.

These compounds comprise more particularly 16α-methyl-6β-fluoro - $\Delta^{17(20)}$ - pregnene - 3β,5α,11α,20-tetrol tetraacetate.

2

(*c*) Compounds of the following formula:

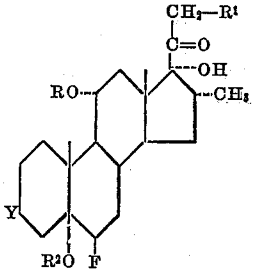

wherein Y is selected from the group consisting of

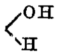

and =O; R and $R^2$ are selected from the group consisting of hydrogen and the acyl radical of a hydrocarbon carboxylic acid of up to 4 carbon atoms; and $R^1$ is selected from the group consisting of hydrogen, iodine, the hydroxyl group and the acyloxy radical of a hydrocarbon carboxylic acid of up to 4 carbon atoms. Among these compounds are more particularly:

16α-methyl - 6β - fluoro - pregnane - 3β,5α,11α,17α,21-pentol-20-one-5,11,21-triacetate, and 16α-methyl-6β-fluoro - pregnane - 3β,5α,11α,17α-tetrol-20-one 5,11-diacetate.

(*d*) Compounds of the following formula:

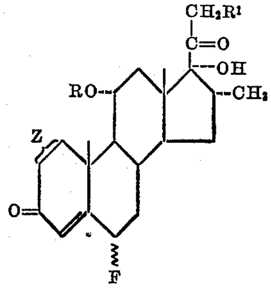

wherein Z is a member of the group consisting of a single and a double carbon-to-carbon bond; ~F is a member of the group consisting of a fluorine atom linked in the α and one in the β position; R and $R^1$ have the same meaning as stated above.

Among these compounds there are more particularly 16α-methyl-6α-fluoro-$\Delta^4$-pregnene - 11α,17α,21-triol-3,20-dione, 11,21-diacetate; 16α-methyl-6β-fluoro-$\Delta^4$-pregnene-11α,17α,21-triol - 3,20 - dione 11,21 - diacetate; and 16α-methyl-6α - fluoro - $\Delta^{1,4}$ - pregnadiene - 11α,17α,21-triol-3,20-dione 11,21-diacetate.

(*e*) Compounds of the following formula:

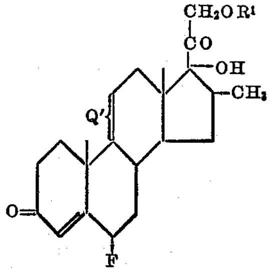

wherein Q' is a member of the group consisting of C=C and

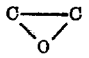

and $R^1$ is selected from the group consisting of hydrogen and the acyl radical of a hydrocarbon carboxylic acid of up to 4 carbon atoms.

As starting compound for making the above new compounds there is preferably used $\Delta^{5,16}$-pregnadiene-3β,11α-diol-20-one, which is prepared from an abundantly available botogenin derivative, 11α-hydroxy diosgenin, by a method which has been described, for instance, in patent application Serial No. 830,210, filed on July 29, 1959, now abandoned.

Botogenin can be isolated easily from certain native Mexican plants. Methods for converting it to 11α-hydroxy-diosgenin have been described in Patent No. 2,776,969 issued January 8, 1957, and in Patent No. 2,840,555, issued June 24, 1958.

The new compounds are produced from the aforesaid starting materials by means of a process which can be illustrated by the following reaction diagram:

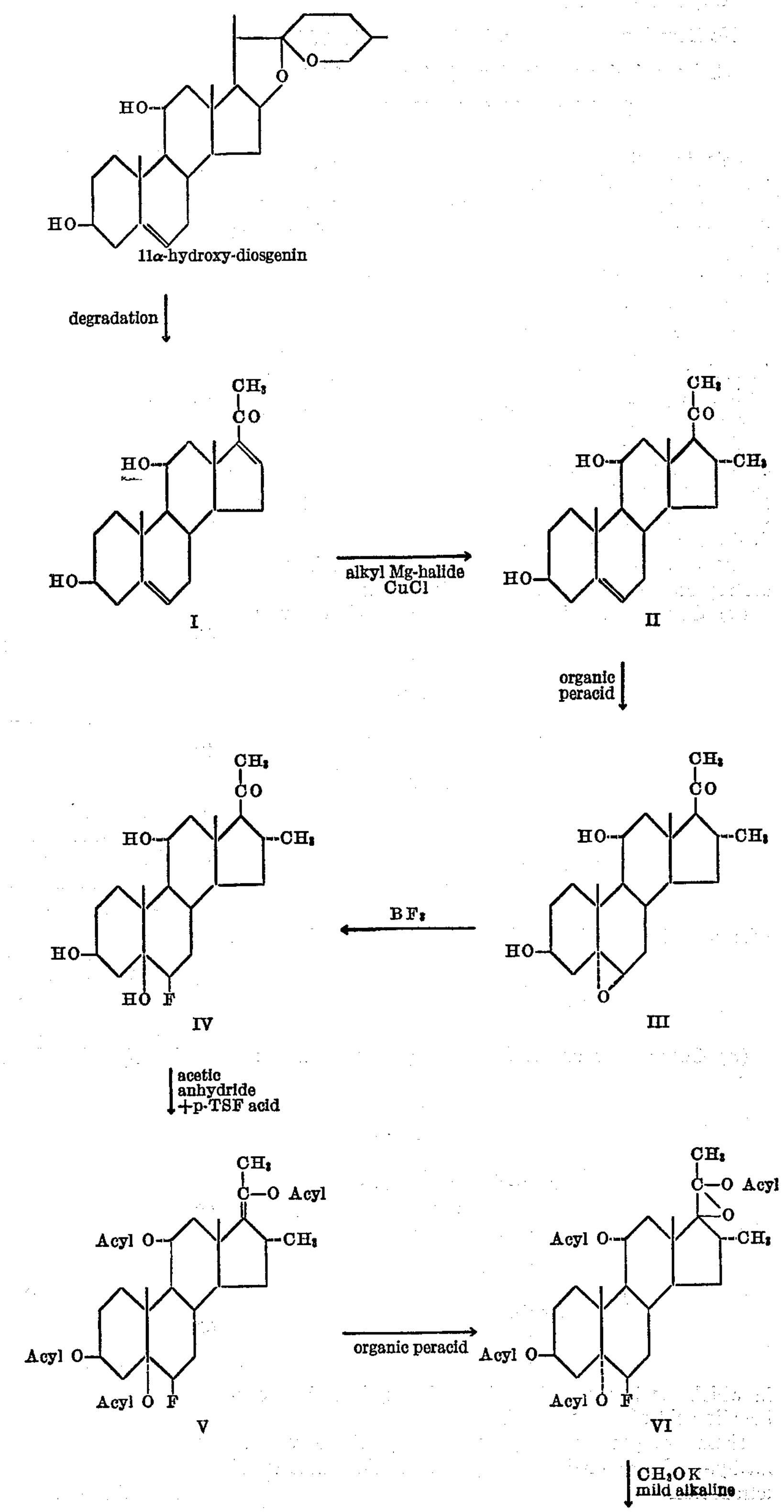

11α-hydroxy-diosgenin
I
II
III
IV
V
VI

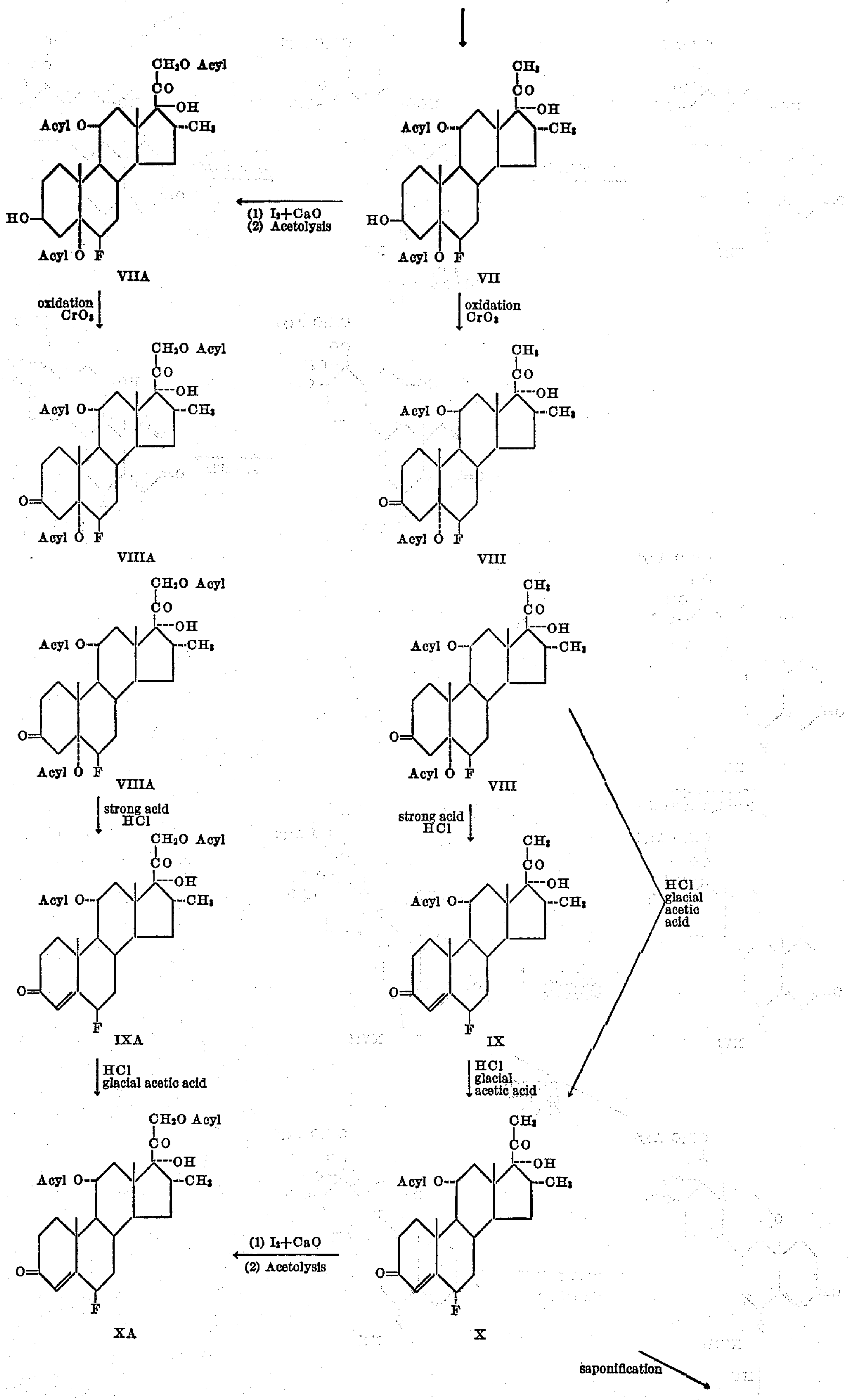
VIIA VII VIIIA VIII VIIIA VIII IXA IX XA X

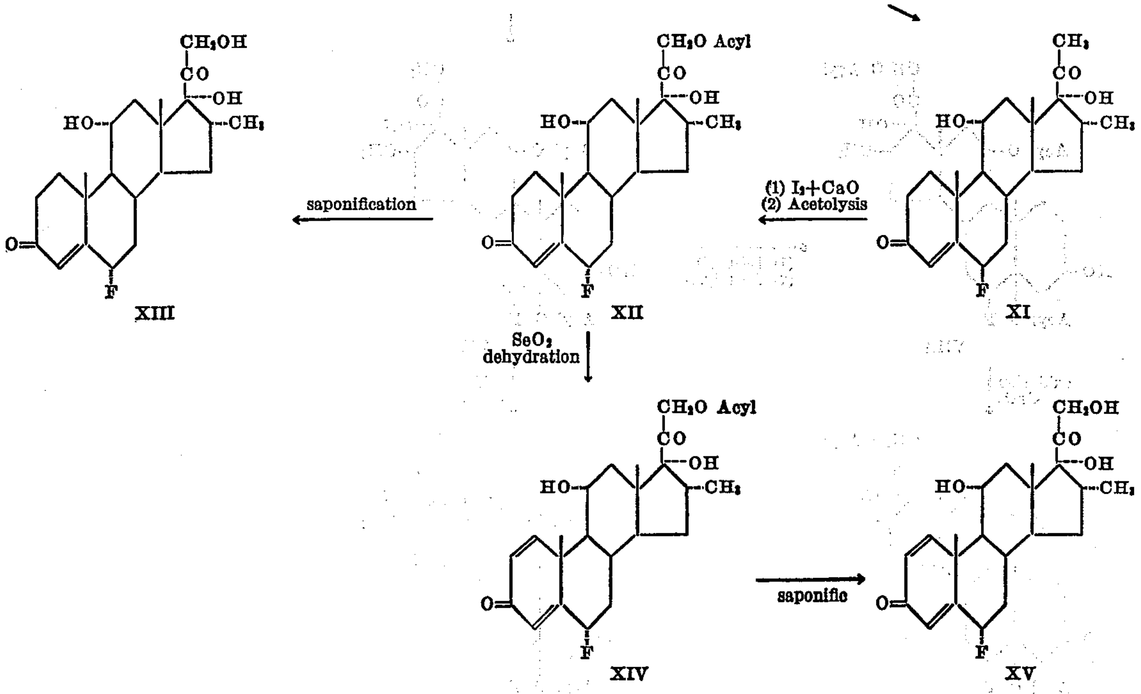
XIII XII XI
XIV XV
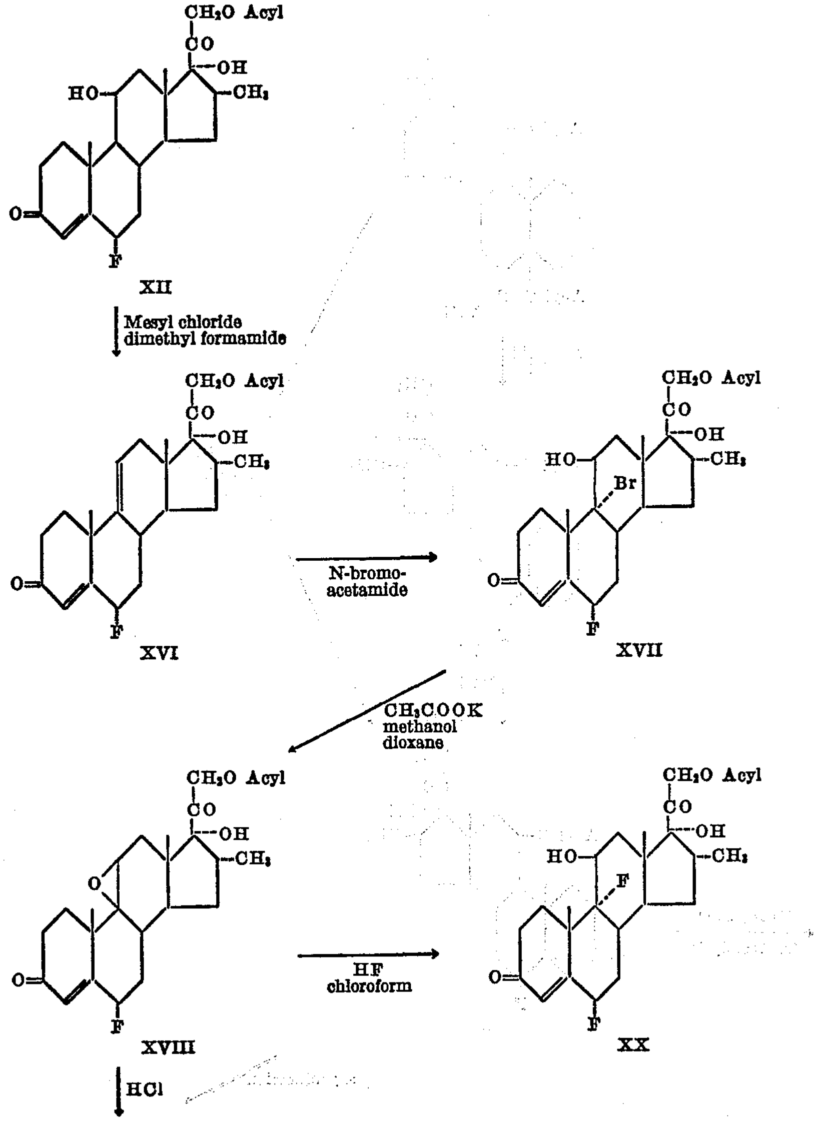
XII
XVI XVII
XVIII XX

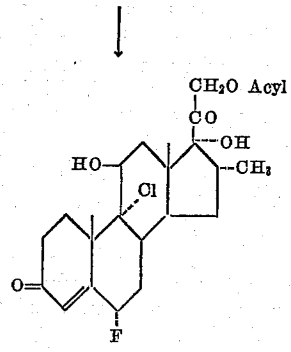

XIX

In accordance with the above illustration of the process there will now be described the best mode of how to carry out these reactions in practice as well as some modifications of the process.

By reaction of $\Delta^{5,16}$-pregnadiene-3β,11α-diol-20-one (I) with a methyl magnesium halide, preferably with methyl magnesium bromide in an inert solvent, such as tetrahydrofurane and in the presence of a monovalent copper halide, preferably cuprous chloride, and at low temperatures, for example at 0° C., there was introduced the 16α-methyl group, thus forming 16α-methyl-$\Delta^5$-pregnene-3β,11α-diol-20-one (II).

The treatment of the above compound with an organic peracid, such as perbenzoic or permonophthalic acid in mixture with an inert solvent, such as ethyl ether or tetrahydrofurane, preferably at room temperature, resulted in the epoxidation of the double bond between C–5 and C–6, thus giving 16α-methyl-5α,6α-oxido-pregnane-3β,11α-diol-20-one (III). Treatment of the latter compound with boron trifluoride, preferably under the form of its etherate or a similar complex, and in mixture with ether-benzene, afforded 16α-methyl-6β-fluoro-pregnane-3β,5α,11α-triol-20-one (IV). The 17α-hydroxyl group was then introduced into this compound via its 20-enol acetate, for which purpose it was heated, for example, with acetic anhydride in the presence of p-toluenesulfonic acid as a catalyst to produce 16α-methyl-6β-fluoro-$\Delta^{17(20)}$-pregnene - 3β,5α,11α,20 - tetrol tetraacetate (V); the double bond between C–17 and C–20 was epoxidized by reaction with an organic peracid, such as perbenzoic acid, and the resulting 16α-methyl-6β-fluoro-17α,20-oxido-pregnane - 3β,5α,11α,20 - tetrol tetraacetate (VI) was subjected to a mild alkaline treatment, for example by reaction with 1% methanolic potassium hydroxide at room temperature, and thus there was obtained 16α - methyl - 6β - fluoro-pregnane-3β,5α,11α,17α-tetrol-20-one 5,11-diacetate (VII).

The 3β-hydroxyl group of the latter compound was oxidized to the 3-keto group by reaction with an oxidizing agent, such as chromic acid in mixture with acetone, to form 16α-methyl-6β-fluoro-pregnane-5α,11α,17α-triol-3,20-dione 5,11-diacetate (VIII). The latter compound was treated with small amounts of a strong acid, such as concentrated hydrochloric acid in mixture with acetic acid, and there was thus obtained 16α-methyl-6β-fluoro-$\Delta^4$-pregnene - 11α,17α - diol-3,20-dione 11-acetate (IX), which upon treatment with dry hydrogen chloride in mixture with glacial acetic acid produced the corresponding 6α-fluoro-compound (X).

The treatment of compound VIII was alternatively effected in a single step with dry hydrogen chloride in mixture with acetic acid and resulted in the elimination of the functional group at C–5 with simultaneous inversion of the steric configuration at C–6, thus producing directly, 16α-methyl-6α-fluoro-$\Delta^4$-pregnene-11α,17α-diol-3,20-dione 11-acetate (X).

By means of a mild alkaline treatment, for example by reaction with 1% methanolic potassium hydroxide, the above compound is saponified into 16α-methyl-6α-fluoro-$\Delta^4$-pregnene-11α,17α-diol-3,20-dione (XI).

For introducing the acetoxy group at C–21, the latter compound was iodinated at this position with iodine and calcium oxide in mixture with tetrahydrofurane and methanol to produce the corresponding 21-iodo derivative, 16α - methyl-6α-fluoro-21-iodo-$\Delta^4$-pregnene-11α,17α-diol-3,20-dione, which was subjected to an acetolysis, preferably by refluxing with potassium acetate in mixture with acetone and under anhydrous conditions; there was thus obtained 16α-methyl-6α-fluoro-$\Delta^4$-pregnene-11α,17α-21-triol-3,20-dione 21-acetate (XII). Saponification of the latter compound by conventional means afforded the free triol (XIII).

Instead of subjecting 16α-methyl-6β-fluoro-pregnane-3β,5α,11α,17α-tetrol-20-one 5,11-diacetate (VII) to the steps of oxidation, dehydration at C–5, inversion at C–6 and acetoxylation at C–21, the order of these operations can be changed and one can start with the acetoxylation at C–21 by means of the reaction with iodine followed by treatment with potassium acetate in acetone, to produce 16α-methyl - 6β - fluoro-pregnane-3β,5α,11α,17α,21-pentol-20-one 5,11,21-triacetate (VII A), which is then subjected to the operations of oxidation at C–3 (VIII A), deacetoxylation at C–5 (IX A) and inversion at C–6, thus giving 16α-methyl-6α-fluoro-$\Delta^4$-pregnene-11α,17α,21-triol-3,20-dione 11,21-diacetate (X A). By hydrolyzation of the 11-acetoxy group of the latter compound and subsequent dehydration, for example by reaction with methanesulfonyl chloride and dimethylacetamide in the heat, there was obtained the above mentioned 16α-methyl-6α - fluoro-$\Delta^{4,9(11)}$-pregnadiene-17α,21-diol-3,20-dione 21-acetate (XVI).

Furthermore, the above intermediate (XII) was subjected to a dehydrogenation with selenium dioxide in mixture with ter-butyl alcohol, thus giving 16α-methyl-6α-fluoro-$\Delta^{1,4}$-pregnadiene-11α,17α,21-triol-3,20-dione 21-acetate (XIV) which was conventionally saponified to obtain the free compound (XV).

The dehydration of 16α-methyl-6α-fluoro-$\Delta^4$-pregnene-11α,17α,21-triol-3,20-dione 21-acetate (XII) by reaction with methanesulfonyl chloride and dimethylacetamide produced 16α-methyl - 6α - fluoro - $\Delta^{4,9(11)}$ - pregnadiene-17α,21-diol-3,20-dione 21-acetate (XVI). To this compound there were added the elements of hypobromous acid, by reaction with N-bromoacetamide in acetone solution and in the presence of perchloric acid, to furnish 16α - methyl-6α-fluoro-9α-bromo-$\Delta^4$-pregnene-11α,17α,21-triol-3,20-dione 21-acetate (XVII), which compound has already been described in patent application Serial No. 789,242 supra.

In order to interchange for the bromine atom in the latter compound fluorine or chlorine, the aforementioned bromohydrin was converted into 16α-methyl-6α-fluoro-9β,11β-oxido-$\Delta^4$-pregnene-17α,21-diol-3,20-dione 21-acetate (XVIII) by reaction with a weak base, for instance by refluxing with potassium acetate in mixture with acetone-dioxane. The epoxide ring was then opened by reaction with hydrogen fluoride or hydrogen chloride, at low temperature, for instance at 0° C., and in chloroform solution to produce the corresponding halohydrins. There were thus obtained 16α-methyl-6α-fluoro-9α-chloro and 16α-methyl-6α,9α-difluoro-derivatives of hydrocortisone 21-acetate (XIX and XX, respectively) which can then be transformed into the respective derivatives of cortisone, prednisone and prednisolone by the procedures already described in patent application Serial No. 789,242, supra.

The aforementioned reactions can be modified within wide limits, both with respect to the reagents and solvents employed as with respect to the conditions under which the transformations are carried out. The following preparation and examples serve to illustrate but do not limit our invention:

PREPARATION I

A mixture of 1 g. of 11α-hydroxy-diosgenin diacetate and 4 cc. of acetic anhydride was heated for 5 hours at 195° C. in a sealed tube. The resulting solution was poured with strong stirring into 100 cc. of water and allowed to react for 1 hour in order to decompose the excess of anhydride. The water was decanted and the gummy product was dissolved in methylene dichloride. This solution was washed with water, saturated aqueous sodium bicarbonate solution and saturated aqueous sodium chloride solution and the solvent was removed. The residue was dissolved in 10 cc. of 80% acetic acid, cooled to 8° C. and treated with a solution of 420 mg. of chromic acid in 5.45 cc. of 90% acetic acid, previously cooled to 8° C. The solution was allowed to react for 10 minutes at room temperature and then poured into water. The product was isolated by extracting with methylene dichloride, washing the extract successively with water, saturated aqueous sodium bicarbonate solution and water. The extract was dried over anhydrous sodium sulfate and evaporated to dryness. The residue was dissolved in 6 cc. of acetone, treated with 5 cc. of water containing 500 mg. of potassium hydroxide and refluxed for 5 hours. The biphasic resulting solution was poured into water and the product was extracted with methylene dichloride, washed with water, dried over anhydrous sodium sulfate and evaporated to dryness. There was thus obtained a mixture of $\Delta^{5,16}$-pregnadiene-3β,11α-diol-20-one and its acetate at C–3 and/or at C–11.

To a suspension of the above mixture in 60 cc. of acetone which was heated to reflux temperature, there was added a solution of 500 mg. of potassium hydroxide in 30 cc. of water and the resulting mixture was refluxed for 3 hours, the solid was dissolved within an hour and reprecipitated. After cooling, the reaction mixture was poured into water; the resulting precipitate was separated by filtration affording the pure $\Delta^{5,16}$-pregnadiene-3β,11α-diol-20-one.

*Example I*

A stirred and cooled mixture of 1 g. of $\Delta^{5,16}$-pregnadiene-3β,11α-diol-20-one and 30 ml. of anhydrous tetrahydrofurane was treated with a mixture of 200 mg. of cuprous chloride, and 10 ml. of a 4 N solution of methyl magnesium bromide in 30 ml. of anhydrous tetrahydrofurane. The mixture was stirred for 4 hours at room temperature and the reaction mixture was then poured into ice water containing dilute hydrochloric acid. The product was extracted with methylene chloride, the extract was washed with water to neutral, dried over anhydrous sodium sulfate and evaporated to dryness under reduced pressure. Crystallization of the residue from acetone-hexane afforded 16α-methyl-$\Delta^5$-pregnene-3β,11α-diol-20-one.

A solution of 10 g. of 16α-methyl-$\Delta^5$-pregnene-3β,11α-diol-20-one in 200 cc. of chloroform was treated with an ether solution of permonophthalic acid containing 1.2 equivalents of the reagent and the mixture was kept in the dark at room temperature for 20 hours; it was then diluted with water and the organic layer was separated, washed with water, aqueous sodium bicarbonate solution and again with water to neutral, dried over anhydrous sodium sulfate and evaporated to dryness under reduced pressure. Chromatography of the residue on neutral alumina yielded 16α-methyl-5α,6α-oxido-pregnane-3β,11α-diol-20-one.

A solution of 8 g. of the above compound in 800 cc. of a mixture of equal parts of ether and benzene was treated with 8 cc. of boron trifluoride etherate and the mixture was allowed to react at room temperature for 3 hours. It was then washed with water, dried over anhydrous sodium sulfate and the solvents were removed under reduced pressure. The residue was chromatographed on neutral alumina, thus furnishing 16α-methyl-6β-fluoro-pregnane-3β,5α,11α-triol-20-one.

A mixture of 6 g. of the latter compound, 2.7 g. of p-toluenesulfonic acid and 300 cc. of acetic anhydride were subjected to a slow distillation so about 240 cc. of distillate was collected in the course of 5 hours. The cooled residue was poured into ice and water and the product was extracted with ether, washed with 5% aqueous sodium carbonate solution and water, dried over anhydrous sodium sulfate and evaporated to dryness. The residue consisted of 16α-methyl-6β-fluoro-$\Delta^{17(20)}$-pregnene-3β,5α,11α,20-tetrol tetraacetate, which was used for the next step without further purification. A pure sample of the compound was obtained by chromatography on neutral alumina.

A mixture of 6 g. of the above crude 16α-methyl-6β-fluoro - $\Delta^{17(20)}$ - pregnene - 3β,5α,11α,20 - tetrol tetraacetate and 240 cc. of a benzene solution of perbenzoic acid containing 1.2 molar equivalents of the acid was kept at room temperature in the dark for 20 hours. Water was then added and the organic layer was separated, washed with aqueous sodium bicarbonate solution and water, dried over anhydrous sodium sulfate and the solvent was evaporated. The residue consisted of the crude 16α-methyl-6β-fluoro-17α,20-oxido-pregnane-3β,5α,11α,20-tetrol tetraacetate. A pure sample of this compound was obtained by crystallization from acetone-hexane.

The above crude oxido compound was treated with 500 cc. of a 1% solution of potassium hydroxide in methanol for 1 hour at room temperature and then the mixture was neutralized with acetic acid, concentrated to a small volume under reduced pressure and diluted with water. The precipitate formed was collected by filtration, washed with water, dried and recrystallized from methanol-acetone. There was thus obtained 16α-methyl-6β - fluoro-pregnane - 3β,5α,11α,17α - tetrol - 20 - one 5,11-diacetate.

To a solution of 2 g. of the above compound in 100 cc. of 90% acetic acid there was added with stirring a solution of 400 mg. of chromium trioxide in 10 cc. of water and 10 cc. of glacial acetic acid, taking care that the temperature did not rise over 15° C. After diluting with ice water, the precipitate was collected, washed with water, dried and recrystallized from acetone-hexane, thus yielding 16α-methyl-6β-fluoro-pregnane-5α,11α,17α-triol-3,20-dione 5,11-diacetate.

A solution of 1.5 g. of the above compound in 100 cc. of glacial acetic acid and 1.5 cc. of aqueous concentrated hydrochloric acid was kept for 1 hour at room temperature and then precipitated by the addition of ice water. The precipitate was collected, washed with water, dried and recrystallized from acetone-hexane. There was thus obtained 16α-methyl-6β-fluoro-$\Delta^4$-pregnene-11α,17α-diol-3,20-dione 11-acetate.

A slow stream of dry hydrogen chloride was introduced for 8 hours into a solution of 1 g. of the above compound in 100 cc. of glacial acetic acid, maintaining the temperature below 18° C. The mixture was then poured into water and the precipitate formed was collected, washed with water, dried and recrystallized from acetone-hexane. There was thus obtained 16α-methyl-6α-fluoro-$\Delta^4$-pregnene-11α,17α-diol-3,20-dione 11-acetate.

In another experiment the reaction with aqueous concentrated hydrochloric acid was omitted and 16α-methyl-6β-fluoro-pregnane-5α,11α,17α-triol-3,20-dione 5,11-diacetate was directly treated with dry hydrogen chloride in mixture with glacial acetic acid, as described above, to produce 16α-methyl-6α-fluoro-$\Delta^4$-pregnene-11α,17α-diol-3,20-dione 11-acetate.

A suspension of 3.8 g. of 16α-methyl-6α-fluoro-$\Delta^4$-pregnene-11α,17α-diol-3,20-dione 11-acetate in 150 cc. of a 1% solution of potassium hydroxide in methanol was stirred at room temperature and under an atmosphere of nitrogen for 60 hours. The mixture was diluted with saturated aqueous sodium chloride solution and the product was extracted with ethyl acetate. The extract was washed to neutral, dried over anhydrous sodium sulfate and the solvent was evaporated to dryness under reduced pressure. Crystallization of the residue from acetone-hexane furnished 16α-methyl-6α-fluoro-$\Delta^4$-pregnene-11α,17α-diol-3,20-dione.

*Example II*

A cooled solution of 2 g. of 16α-methyl-6α-fluoro-$\Delta^4$-pregnene-11α,17α-diol-3,20-dione in 15 cc. of tetrahydrofurane and 9 cc. of methanol was treated with stirring with 3 g. of calcium oxide and then with 3 g. of iodine. The stirring was continued at room temperature until the solution turned pale yellow and the mixture was then poured into ice water containing 8 cc. of acetic acid and 1 g. of sodium thiosulfate and stirred for 15 minutes more; most of the supernatant liquid was decanted and the precipitate was filtered, washed with water and dried under vacuum. There was thus obtained 16α-methyl-6α-fluoro-21-iodo-$\Delta^4$-pregnene-11α,17α-diol-3,20-dione.

A mixture of the above substance, 50 cc. of acetone and 6 g. of recently fused potassium acetate was refluxed for 8 hours, concentrated to a small volume under reduced pressure, cooled, diluted with water and the product was extracted with ether. The extract was washed with water, dried over anhydrous sodium sulfate and concentrated until crystallization started. After cooling, the crystals were collected by filtration and recrystallized from acetone-hexane. There was thus obtained 16α-methyl-6α-fluoro-$\Delta^4$-pregnene-11α,17α,21-triol-3,20-dione 21-acetate.

*Example III*

A suspension of 800 mg. of 16α-methyl-6α-fluoro-$\Delta^4$-pregnene-11α,17α,21-triol-3,20-dione 21-acetate in 8 cc. of methanol containing 80 mg. of potassium hydroxide was stirred at 0° C. under an atmosphere of nitrogen for 1 and a half hours (a complete solution was obtained after 45 minutes). The mixture was acidified with acetic acid, diluted with saturated sodium chloride solution containing ice and the precipitate was filtered, thus giving the free 21-hydroxy compound. A pure sample was obtained by crystallization from acetone-hexane.

*Example IV*

A mixture of 5 g. of 16α-methyl-6α-fluoro-$\Delta^4$-pregnene-11α,17α,21-triol-3,20-dione 21-acetate, 250 cc. of t-butanol, 0.5 cc. of pyridine and 1.6 g. of recently sublimed selenium dioxide was refluxed under an atmosphere of nitrogen for 48 hours, filtered through celite and evaporated to dryness under reduced pressure. The residue was dissolved in acetone, refluxed with decolorizing charcoal for 1 hour, filtered and the acetone was evaporated to dryness. The residue was purified by chromatography, thus affording 16α-methyl-6α-fluoro-$\Delta^{1,4}$-pregnadiene-11α,17α,21-triol-3,20-dione 21-acetate.

*Example V*

A suspension of 1.2 g. of 16α-methyl-6α-fluoro-$\Delta^{1,4}$-pregnadiene-11α,17α,21-triol-3,20-dione 21-acetate in 18 cc. of methanol containing 120 mg. of potassium hydroxide was stirred for 90 minutes, acidified and diluted with ice cold saturated sodium chloride solution. The precipitate formed was collected, thus giving the free 21-hydroxy compound which was purified by crystallization from acetone-ether.

*Example VI*

5 g. of 16α-methyl-6α-fluoro-$\Delta^4$-pregnene-11α,17α,21-triol-3,20-dione 21-acetate was dissolved with slight heating in 70 cc. of dimethyl-formamide, cooled and treated with 2.5 g. of mesyl chloride. The mixture was heated at 80° C. for 30 minutes, cooled, diluted with water and the organic layer was separated, washed, dried and evaporated; the residue was purified by crystallization from acetone-hexane, thus giving 16α-methyl-6α-fluoro-$\Delta^{4,9(11)}$-pregnadiene-17α,21-diol-3,20-dione 21-acetate.

A solution of 3.75 g. of the above substance in 40 cc. of pure dioxane and 6 cc. of 0.4 N perchloric acid was treated in the course of 1 hour with 2.1 g. of N-bromoacetamide, at room temperature and in the dark. The mixture was stirred for 1 hour further and then treated with 10% aqueous sodium sulfite solution until the potassium iodide-starch indicator paper no longer gave a blue reaction. Ice and chloroform were then added and the organic layer was separated, washed to neutral and concentrated under reduced pressure at a temperature below 25° C. Upon trituration of the residue with acetone and cooling, there was obtained 16α-methyl-6α-fluoro-9α-bromo-$\Delta^4$-pregnene-11β,17α,21-triol-3,20-dione 21-acetate.

A solution of 4 g. of the above compound in 8 cc. of dioxane was slowly added to a mixture of 1.3 g. of anhydrous potassium acetate and 16 cc. of absolute methanol which had been heated almost to boiling. The mixture was refluxed for 45 minutes, cooled and treated under stirring with 50 cc. of ice water. The precipitate formed was collected, washed with water and dried. There was thus obtained 16α-methyl-6α-fluoro-9β,11β-oxido-$\Delta^4$-pregnene-17α,21-diol-3,20-dione 21-acetate.

In a polyethylene flask fitted with a magnetic stirrer there was dissolved 2.5 g. of the above compound in 40 cc. of pure chloroform, cooled to 0° C. and treated at 0° C. with 0.4 g. of anhydrous hydrogen fluoride in the course of 20 minutes and under continuous stirring. The stirring was continued for 2 hours longer at 0° C. and then the mixture was neutralized by the cautious addition of aqueous sodium bicarbonate solution; the chloroform solution was washed with water and concentrated under reduced pressure until an abundant precipitate was obtained. After cooling, the precipitate was collected, redissolved in 10 cc. of hot ethyl acetate, filtered from some insoluble material and cooled. The crystalline precipitate was filtered, thus giving 16α-methyl-6α,9α-difluoro-$\Delta^4$-pregnene-11β,17α,21-triol-3,20-dione 21-acetate.

A solution of 4 g. of 16α-methyl-6α-fluoro-9β,11β-oxido-$\Delta^4$-pregnene-17α,21-diol-3,20-dione 21-acetate in 40 cc. of redistilled chloroform was treated with 28 cc. of a 0.45 N solution of dry hydrogen chloride in chloroform, which was added slowly, under stirring and maintaining the temperature at around 0° C. The stirring was continued for 1 hour longer at 0° C. and the mixture was then diluted with water, the organic layer was separated, washed with water, dried and evaporated to dryness under reduced pressure. Crystallization of the residue from acetone yielded 16α-methyl-6α-fluoro-9α-chloro-$\Delta^4$-pregnene-17α,21-diol-3,20-dione 21-acetate.

*Example VII*

A cooled solution of 4 g. of 16α-methyl-6β-fluoro-pregnane-3β,11α,5α,17α-tetrol-20-one 5,11-diacetate in 30 cc. of tetrahydrofurane and 20 cc. of methanol was treated with iodine and then with potassium acetate, in accordance with the procedure described in Example II for such reaction as applied to 16α-methyl-6α-fluoro-$\Delta^4$-pregnene-11α,17α-diol-3,20-dione. There was thus obtained 16α-methyl - 6β - fluoro-pregnane-3β,5α,11α,17α,21-pentol-20-one 5,11,21-triacetate.

A solution of 5 g. of the above compound in 300 cc. of acetic acid was treated first with chromic acid and then with hydrogen chloride, in accordance with the method described in Example I for 16α-methyl-6β-fluoro-$\Delta^4$-pregnene-11α,17α-diol-3,20-dione. There was thus finally obtained 16α-methyl-6α-fluoro-$\Delta^4$-pregnene-11α,17α,21-triol-3,20-dione 11,21-diacetate.

*Example VIII*

16α - methyl - 6α-fluoro-$\Delta^4$-pregnene-11α,17α-diol-3,20-dione 11-acetate obtained as described in Example I, was treated by the method as described in Example II. There was obtained first 16α-methyl-6α-fluoro-21-iodo-$\Delta^4$-pregnene-11α,17α-diol-3,20-dione 11-acetate and finally 16α-methyl - 6α-fluoro-$\Delta^4$-pregnene-11α,17α,21-triol-3,20-dione 11,21-diacetate.

We claim:

16α - methyl-6β-fluoro-21-iodo-pregnane-3β,5α,11α,17α-tetrol-20-one 5,11-diacetate.

References Cited in the file of this patent

UNITED STATES PATENTS

| | | |
|---|---|---|
| 2,649,402 | Murray et al. | Aug. 18, 1953 |
| 2,776,969 | Rosenkranz et al. | Jan. 8, 1957 |
| 2,838,498 | Magerlein et al. | June 10, 1958 |
| 2,838,535 | Magerlein et al. | June 10, 1958 |
| 2,841,600 | Hogg et al. | July 1, 1958 |

OTHER REFERENCES

Arth et al.: 80, J.A.C.S., 3161–62 (1958).
Oliveto et al.: 80, J.A.C.S., 4431 (1958).
Rothman et al.: 81, J.A.C.S., 411–15 (1959).